United States Patent Office 3,489,819
Patented Jan. 13, 1970

3,489,819
BLOCK COPOLYMERS COMPRISING A LACTONE AND TETRAHYDROFURAN
William R. Busler, Bartlesville, Okla., assignor to Phillips Petroleum Company, a corporation of Delaware
No Drawing. Filed July 19, 1967, Ser. No. 654,383
Int. Cl. C08g 17/02, 39/10
U.S. Cl. 260—823
10 Claims

ABSTRACT OF THE DISCLOSURE

Block copolymers formed from a lactone, such as beta-propiolactone, and tetrahydrofuran using an acidic compound, such as antimony pentachloride, as an initiator.

---

This invention relates to a new and improved block copolymer and a new and improved method for making same.

Heretofore, block copolymers have been formed from conjugated diene compounds and monovinyl-substituted aromatic compounds using known initiators.

By the term "block copolymer," what is meant is a copolymer of two different monomers, the macromolecules of which copolymer are composed of at least two segments, usually linear, joined together in an end-to-end relation, one segment being formed predominantly, i.e. greater than 50 weight percent based on the weight of the segment, of one monomer and another segment being formed predominantly of another different monomer. For example, if two different monomers A and B are employed in making the block copolymer and the resulting block copolymer contains two segments, a macromolecule of this copolymer can be represented by the structure: AAAAABBBBBB.

It has now been found that a block copolymer can be formed using at least one lactone as one monomer and tetrahydrofuran as the other different monomer, and employing certain acidic materials as hereinafter defined as the initiator (catalyst).

This invention also relates to the block copolymer itself wherein the macromolecules which make up that copolymer contain at least two segments, usually linear, joined in an end-to-end relationship, at least one segment being formed predominantly of a monomer of one of the two monomer classes, i.e., lactones and tetrahydrofuran, and at least one other segment, usually linear, being formed predominantly of a monomer from the class of monomers not used to form the first memtioned segment. Thus, in the above example where different monomers are denoted as A and B, a copolymer within the scope of this invention can be represented structurely by substituting tetrahydrofuran for the A and one or more lactones for the B or vice versa.

The block copolymers of this invention are moldable materials and can be employed in making adhesive or coating compositions and in the preparation of laminates of sheets of polymeric material. The block copolymers of this invention can also be used to make fibers and film. For example, block copolymers of tetrahydrofuran and beta-propiolactone can be formed into tough, transparent films useful as packaging materials and the like.

Accordingly, it is an object of this invention to provide a new and improved block copolymers.

It is another object of this invention to provide a new and improved method of making block copolymers.

Other aspects, objects, and advantages of this invention will be apparent to those skilled in the art from the description and appended claims.

Lactones that can be employed in this invention can be represented by the formula

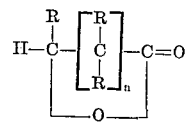

wherein R is one of hydrogen, a saturated aliphatic, a saturated cycloaliphatic, or an aromatic radical, or combination thereof, $n$ is an integer which can be 1, 3, or 4, and the total number of carbon atoms in the substituents employed, if any, is in the range of 1 to 12, inclusive.

Suitable lactones include beta-propiolactone, delta-valerolactone, epsilon-caprolactone, and lactones of the following acids: 2-dodecyl-3-hydroxypropionic acid, 2,2-dimethyl-3-hydroxypropionic acid, 5-hydroxy-2-methyl-3-phenylvaleric acid, 5 - hydroxy-2,2,3-trimethyl-4-phenyl-valeric acid, and the like.

The lactones represent one of the different monomer classes employed in this invention. The other different monomer class is composed of tetrahydrofuran.

The initiators employed in this invention include aluminum trichloride, aluminum tribromide, ferric chloride, ferric bromide, antimony pentachloride, phosphorus pentachloride, boron trifluoride, polyphosphoric acid, orthophosphoric acid, trifluoroacetic acid, chlorosulfonic acid, and compounds represented by the formula $R'_3CSbCl_6$ wherein $R'$ contains from 1 to 18 carbon atoms, inclusive, and is selected from the group consisting of alkyl, aryl, alkaryl, alkenylaryl, alkoxyaryl, and mixtures thereof, the total number of carbon atoms in the substituents on an aryl group not exceeding 6. Specific examples of $R'$ include methyl, phenyl, 1-naphthyl, 2-naphthyl, 2-biphenylyl, 3-biphenylyl, 4-biphenylyl, 4-methylphenyl, 2,3,5-triethylphenyl, 2,4,6-trimethylphenyl, 2,4,6-triethylphenyl, 4-n-hexylphenyl, 3,5-diisopropylphenyl, 3-isopropylphenyl, 4-butoxyphenyl, 2-methoxyphenyl, 2,6-dimethoxyphenyl, 2-butenylphenyl, 2-(3,6-dimethyl)naphthyl, 4-vinylphenyl, 2-propenylphenyl, 1-(4,6-dimethyl)-naphthyl, 1-(4-ethoxy)napthyl, 2-(7-vinyl)naphthyl, 4-(2,3,2',3' - tetramethyl)biphenyl, 2 - (4-isopropenyl)biphenylyl, 3-(4'-n-hexoxy)biphenylyl groups, and mixtures thereof. Preferred catalysts are antimony pentachloride and phosphorus pentachloride.

The initiators and their methods of preparation are all known to those skilled in the art and most are available commercially. Polyphosphoric acid is defined and its method of preparation disclosed in The Journal of the American Chemical Society, vol. 83, No. 7, Apr. 5, 1961, pages 1715–1721, inclusive. The compounds represented by the formula $R'_3CSbCl_6$ can be prepared by the reaction of antimony pentachloride with a compound represented by the formula $R'_3CCl$. Specific examples of suitable $R'_3CCl$ compounds include triphenylchloromethane, trimethylchloromethane, methyldiphenylchloromethane, dimethylphenylchloromethane, tri(2,4,6 - trimethylphenyl)chloromethane, tri(2,4,6 - triethylphenyl)chloromethane, tri(4 - n-hexylphenyl)chloromethane, tri(3,5-diisopropylphenyl)chloromethane, methyldi(4-butoxyphenyl)chloromethane, dimethyl - 2,6-dimethoxyphenylchloromethane, tri - 4-vinylphenylchloromethane, tri-3-(2-propenyl)phenylchloromethane, tri - 2-ethyl-4-(2-butenyl)phenylchloromethane, tri - 1-naphthylchloromethane, tri-2-naphthylchloromethane, methyldi-2-(3,6-dimethyl)naphthylchloromethane, dimethyl - 1-(4-ethoxy)naphthylchloromethane, tri - 2-(7-vinyl)naphthylchloromethane, tri-2-biphenylylchloromethane, tri-3-biphenylylchloromethane, tri-4-biphenylylchloromethane, tri-4-(2,3,2',3'-tetramethyl)biphenylylchloromethane, tri-2-(4-isopropenyl)biphenylylchloromethane, and tri-3-4'-n-hexoxy)biphenylylchloromethane. The products can be regarded as complex compounds, $R'_3CCl \cdot SbCl_5$. The reaction can be carried out at room temperature or at an elevated temperature. If desired, the reaction can be conducted in the presence of any suitable inert diluent, e.g. a halogenated hydrocarbon such as chloroform or carbon tetrachloride. The reactants are generally employed in a 1:1 mol ratio, although an excess of one or the other can be used. When the two reactants are brought together, a yellow crystalline solid forms which can be separated and purified.

When preparing the block copolymers of this invention, the amount of each different monomer employed can vary widely but will generally be in the range of from about 5 to about 95 parts by weight based on 100 parts by weight of the total monomers employed to make the block copolymer. Thus, from about 5 to about 95 weight percent of at least one lactone will be employed and from about 5 to 95 weight percent of tetrahydrofuran will be employed in making the particular block copolymer, the weight percentages being based upon the total weight of the lactone or lactones and tetrahydrofuran employed in making that block copolymer. Thus, the block copolymers themselves will contain amounts of monomers within the same 5 to 95 weight percent ranges as disclosed for the making of the block copolymers. The properties of the block copolymer produced by this invention are determined at least in part by the relative amounts of the different monomers employed, these product copolymers ranging from hard plastics to powdery materials.

The amount of the initiator or initiators used in making the block copolymers of this invention can vary widely and will generally be that which is sufficient to effect the polymerization of substantially all monomers charged, even though the monomers may be charged in sequence one after the other. The catalyst level can generally be in the range of from about 0.25 to about 20, preferably from about 0.5 to about 10, gram millimoles per 100 grams total monomers [lactone(s) and tetrahydrofuran] to be polymerized.

The block copolymers of this invention are formed by charging ones of the monomers and the catalyst to a conventional reactor and conducting the polymerization under polymerization conditions such that the conversion charged monomer or monomers is substantially complete. Thereafter, the other monomer, different from the first, is charged and polymerized under polymerization conditions such that the conversion of the second monomer is substantially completed. Although either monomer can be charged and polymerized initially, it is presently preferred that tetrahydrofuran be first charged and polymerized and that thereafter the lactone or lactones be charged in toto or in sequence and polymerized. However, if desired, the lactone or lactones can be charged first and polymerized and thereafter the tetrahydrofuran can be charged and polymerized. If desired, a lactone or lactones can be charged first and polymerized, thereafter the tetrahydrofuran charged and polymerized, and thereafter an additional lactone or lactones, which can be the same or different from those used in forming the first segment of the block copolymer, can be charged and polymerized thereby forming a three-block copolymer. A three-block copolymer can also be formed by charging the tetrahydrofuran first. It is preferred but not required that all monomers charged be polymerized substantially completely, any polymerization step being conducted to any desired conversion percentage or monomer.

The polymerization reaction can be carried out under conditions of temperature and pressure effective for making the desired block copolymer. Generally, the polymerization temperature will be in the range of from about −100 to about 250, preferably from about 20 to about 150° F. under pressure sufficient to maintain the polymerization reaction mixture substantially in the liquid phase. The polymerization time is temperature dependent and sufficient time is preferably allowed in the first polymerization step for substantially complete conversion of the monomer. This polymerization time will generally be in the range of from about 1 minute to about 100 hours or more. The same polymerization time criteria and time range also applies to the polymerization of the second, third, and any additional monomer polymerization steps. The polymerization temperature can be tailored to the particular monomer to be employed and therefore the polymerization temperatures for forming any given segment of the block copolymer can vary from one another or be the same depending upon the monomers employed for making those polymer segments. Polymerization time can also vary in the same manner as the polymerization temperature depending upon the monomers employed for making any given polymer segment.

The polymerization process of this invention can be conducted in the presence or absence of a diluent and therefore the polymerization process can be conducted either as a mass or a solution polymerization process. Diluents which can be employed include hydrocarbons such as paraffins, cycloparaffins, and aromatics containing from 4 to 10 carbon atoms per molecule, inclusive, and halogenated hydrocarbons containing from 1 to 10 carbon atoms per molecule, inclusive, preferably chlorinated hydrocarbons. Suitable diluents include butane, n-pentane, cyclohexane, benzene, toluene, xylene, chloroform carbon tetrachloride, tetrachloroethane, 1,10 - dichlorodecane, chlorobenzene, 1-chloronaphthalene, and the like. Mixtures of two or more of any of these diluents can also be used.

The block copolymers of this invention can be recovered in a conventional manner such as catalyst deactivation by the addition of ammonia or other known deactivating agents, separation of the polymer from solution such as by vaporization of the diluent thereby leaving the polymeric product, and drying the polymer. The block copolymers can be compounded in a conventional manner with conventional additives such as extenders, plasticizers, vulcanizing agents, vulcanization accelerators and other compounding ingredients, carbon black, pigments, antioxidants, and other known stabilizers. The block copolymers can then be formed in film or fiber form using known techniques such as extrusion.

EXAMPLE

A series of runs was made for the production of block copolymers of tetrahydrofuran and beta-propiolactone in a mass polymerization system. The tetrahydrofuran block was prepared first using antimony pentachloride as the initiator. The unquenched polymeric product served as the initiator for the polymerization of the lactone. The amount of beta-propiolactone was held constant but the tetrahydrofuran was varied. The recipe was as follows:

Tetrahydrofuran, grams _____ Variable
Beta-propiolactone, grams _____ 100
Antimony pentachloride, millimoles _____ 4

Tetrahydrofuran was charged first after which the reactor was purged with nitrogen. The mixture was cooled to 32° F. and antimony pentachloride added. After a reaction period of between 2 and 3 hours the beta-propiolactone was introduced, the temperature was adjusted to 41° F., and the polymerization was continued for about 16 hours. Chloroform was then added to dissolve the block copolymer product. The product was recovered by coagulation in methyl alcohol containing sufficient aqueous ammonia to make the mixture basic. The polymer was separated by filtration and dried. The amount of tetrahydrofuran charged and percent conversion (based on total monomers charged) in each run were as follows:

TABLE I

| Run No.: | THF, grams | Total monomers charged, grams | Catalyst level, mhm.[1] | Conversions, percent |
|---|---|---|---|---|
| 1 | 50 | 150 | 2.7 | 37 |
| 2 | 100 | 200 | 2.0 | 35 |
| 3 | 150 | 250 | 1.6 | 49 |
| 4 | 200 | 300 | 1.3 | 61 |

[1] mhm=gram millimoles per 100 grams monomers.

A 4-gram sample of each of the polymers was cut into about 2.5 millimeter cubes and treated with 100 ml. of toluene at 122° F. for 20 hours. The mixtures were each agitated throughout the treating period. The mixtures were each filtered to remove undissolved material and the solvent was evaporated to recover the extracted polymer. A sample of poly(tetrahydrofuran) was also treated with toluene under the same conditions used for the block copolymer samples except that the period was shortened from 20 hours to 2 hours because the extraction was complete after 2 hours. This run was used as a control. Results were as follows:

TABLE II

| Run No.: | Percent extracted |
|---|---|
| 1 | 5.2 |
| 2 | 3.2 |
| 3 | 8.5 |
| 4 | 14 |
| Control | 100 |

The data in Table II show that the lactone formed a polyester block on the polymerized tetrahydrofuran. If this were not the case, there would have been a much greater amount of extracted material in runs 1–4.

A sample of the block copolymer from run 4 and Table II and also poly(beta-propiolactone) were examined by infrared spectroscopy. A comparison of results indicated that the block copolymer consisted of 45 percent tetrahydrofuran units and 55 percent beta-propiolactone units.

A sample of the block copolymer from run 4 of Table II was pressed into a thin sheet about 0.003 inch in thickness. Uniaxially cold drawing of the sheet substantially parallel to its longitudinal axis at room temperature to between 400 percent and 500 percent of its original length gave a very strong transparent film.

Reasonable variations and modifications are possible within the scope of this disclosure without departing from the spirit and scope thereof.

That which is claimed is:

1. A method for making a block copolymer comprising contacting under polymerization conditions only one of (1) at least one lactone having the formula

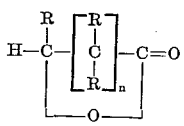

wherein each R is one of hydrogen, saturated aliphatic, saturated cycloaliphatic, aromatic, and combinations thereof, and n is an integer of 1, 3, or 4, and the total number of carbon atoms of all of the R substituents present, if any, is in the range of 1 to 12, inclusive, and (2) tetrahydrofuran with an effective catalytic amount of at least one compound selected from the group consisting of aluminum trichloride, aluminum tribromide, ferric chloride, ferric bromide, antimony pentachloride, phosphorus pentachloride, boron trifluoride, polyphosphoric acid, orthophosphoric acid, trifluoroacetic acid, chlorosulfonic acid, and compounds represented by the formula R'$_3$CSbCl$_6$ wherein R' contains from 1 to 18 carbon atoms, inclusive, and is selected from the group consisting of alkyl, aryl, alkaryl, alkenylaryl, alkoxyaryl, and mixtures thereof, the total number of carbon atoms in the substituents on the aryl groups not exceeding 6, continuing the polymerization to the desired degree of completion, adding to the polymerization mixture the other of (1) or (2) which was not added first, and continuing the polymerization of the second added monomer to the desired degree of completion.

2. The method according to claim 1 wherein the catalyst is one of antimony pentachloride and phosphorus pentachloride.

3. The method according to claim 1 wherein (1) R is hydrogen and n is 1.

4. The method according to claim 1 wherein the amounts of each of (1) and (2) used are from about 5 to about 95 weight percent based on the total weight of (1) and (2) employed for polymerization, the amount of initiator employed is from about 0.25 to about 20 gram millimoles per 100 grams of the total of (1) and (2) employed for polymerization, the polymerization temperature or temperatures for all polymerization steps is in the range of from about −100 to about 250° F., and a diluent selected from the group consisting of paraffins, cycloparaffins, and aromatics containing from 4 to 10 carbon atoms per molecule, inclusive, and halogenated hydrocarbons containing from 1 to 10 carbon atoms per molecule, inclusive, are employed.

5. The method according to claim 1 wherein (1) R is hydrogen and n is 1, the initiator is antimony pentachloride, and (2) is polymerized to substantial completion first and thereafter (1) is charged and polymerized.

6. A block copolymer wherein the macromolecules are made up of at least two different polymeric segments joined in an end-to-end relationship, at least one segment being substantially a polymer of tetrahydrofuran, and at least one other segment being substantially a polymer of at least one lactone having a formula

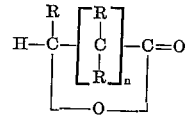

wherein R is one of hydrogen, saturated aliphatic, saturated cycloaliphatic, aromatic, and combinations thereof, n is an integer of 1, 3, or 4, and the total number of carbon atoms of all of the R substituents present, if any, is in the range of 1 to 12, inclusive.

7. The copolymer according to claim 6 wherein the one segment is a homopolymer of tetrahydrofuran and one segment is a polyester of beta-propiolactone.

8. The copolymer according to claim 6 wherein one segment is a homopolymer of tetrahydrofuran and one segment is a polyester of delta-valerolactone.

9. The copolymer according to claim 6 wherein one segment is a homopolymer of tetrahydrofuran and one segment is a polyester of epsilon-caprolactone.

10. The block copolymer according to claim 6 wherein the block copolymer contains from about 5 to about 95 weight percent tetrahydrofuran and from about 5 to about 95 weight percent of at least one lactone, both weight percentages being based upon the total amount of tetrahydrofuran and lactone or lactones in the block copolymer.

References Cited

UNITED STATES PATENTS

| 3,259,607 | 7/1966 | Cheroron et al. | 260—78.3 |
| 3,312,753 | 4/1967 | Bailey et al. | 260—860 |
| 3,376,361 | 4/1968 | Halek et al. | 260—823 |

MURRAY TILLMAN, Primary Examiner

M. J. TULLY, Assistant Examiner

U.S. Cl. X.R.

260—78.3, 860